United States Patent [19]

Hartz

[11] Patent Number: 4,706,785
[45] Date of Patent: Nov. 17, 1987

[54] SINGLE POINT ACTUATED SELF-ADJUSTING BRAKE MECHANISM IN A VEHICLE DRIVEN BY A CROSS-DRIVE TRANSMISSION

[75] Inventor: James F. Hartz, Indianapolis, Ind.

[73] Assignee: General Motors Corporation, Detroit, Mich.

[21] Appl. No.: 928,861

[22] Filed: Nov. 10, 1986

Related U.S. Application Data

[63] Continuation-in-part of Ser. No. 889,271, Jul. 25, 1986, abandoned.

[51] Int. Cl.⁴ ............................................. F16D 65/14
[52] U.S. Cl. ................................ 188/106 F; 188/71.8; 188/72.6; 188/196 R
[58] Field of Search .................. 188/106 F, 72.6, 71.8, 188/196 R

[56] References Cited

U.S. PATENT DOCUMENTS

| | | | |
|---|---|---|---|
| 1,852,287 | 4/1932 | Bragg et al. | 188/106 F X |
| 3,670,854 | 6/1972 | Maci | 188/106 F X |
| 3,734,242 | 5/1973 | Klaue | 188/106 F X |
| 4,159,754 | 7/1979 | Airheart et al. | 188/106 F X |
| 4,235,310 | 11/1980 | Kibler et al. | 188/718 X |

Primary Examiner—George E. A. Halvosa
Attorney, Agent, or Firm—D. D. McGraw

[57] ABSTRACT

A cross-drive transmission has a hydraulic brake apply system and a mechanical brake apply system actuated through the same rotary input shaft of the vehicle operator. Rotation of the input shaft rotates a cam which controls a brake control valve which causes a regulated brake apply pressure to be delivered to the hydraulic portion of the brake system for service brake actuation. The cam is moved angularly through a desired angular range which will normally deliver the maximum hydraulic pressure used to actuate the brakes. After the angle is achieved, further rotation of the input shaft causes the cam to enter a dwell phase which permits additional stroke of the mechanical brake apply system if required. This may be required at times because of inadequate hydraulic pressure available from a suitable hydraulic pressure source or the inability of the hydraulic brake apply system to achieve the required braking effort. The mechanical system is driven through a differential gear assembly with differential output members acting to drive the brake pack actuators. One-way clutch mechanisms allow the differential output members to move without limitation in the brake applying direction but limit the return stroke of them, and therefore the return stroke of the ball ramp cam apply rings and the brake torque arms actuating them so as to establish brake adjustment.

3 Claims, 4 Drawing Figures

SINGLE POINT ACTUATED SELF-ADJUSTING BRAKE MECHANISM IN A VEHICLE DRIVEN BY A CROSS-DRIVE TRANSMISSION

The invention herein described was made in the course of work under a contract or subcontract thereunder with the Department of Defense.

This is a continuation-in-part of application Ser. No. 889,271, filed July 25, 1986, now abandoned.

The invention relates to a brake mechanism in a vehicle such as military and other track laying vehicles driven by a cross-drive transmission. It is also applicable to other vehicles having other road surface engaging arrangements but using a cross-drive transmission.

Cross-drive transmissions for military track laying vehicles and the like customarily provide an arrangement for decelerating the vehicle by dissipating a portion or all of the vehicle's kinetic energy in disc brake packs comprised of multiple disc plates. Such multiple plate brakes are usually required in order to allow sufficient total friction area to limit the unit energy input to reasonable values. The fitting of multiple plates in such disc brake packs entails limit stack problems in achieving a desired range of running clearance to minimize parasitic loss during driving without braking. Also, progressive wear of the friction surfaces of the disc brake packs introduces the difficulty of increasing stroke distance of the actuating mechanism used to apply clamping forces to the brake pack assemblies, as well as the need to make periodic adjustments to the disc brake packs in order to maintain consistent brake apply timing.

The invention herein disclosed and claimed will eliminate the need for measurement and adjustment of each of the brakes at initial assembly, will maintain substantially constant brake disc plate running clearance, and constant apply piston stroke distance throughout the usable life of the brake packs. It will permit a single point of actuating input force to the brake system for service braking, emergency braking, and parking brake operations.

More particularly, when used in a cross-drive transmission having a left and a right driving and braking member, and left and right mechanically and hydraulic pressure actuatable brakes thereon for respectively braking the left and right driving and braking members, a brake actuator is provided which is moveable in accordance with braking force demand for controlling the hydraulic actuation of the brakes as well as mechanical actuation thereof. The actuator acts when braking force is demanded for normal service braking to admit hydraulic brake actuating pressure to act on the brakes in accordance with the brake force demanded, up to a hydraulic pressure limit. A mechanical brake apply system, including a differential gear assembly having an input member and left and right differential output members which are respectively connected to the left and right brakes, will mechanically actuate the brakes with equalized apply force when the disclosed and claimed invention is employed. The single point brake actuator will also act on the input member of the mechanical brake apply system differential gear assembly in accordance with the brake force demand. The mechanical brake actuation forces are transmitted through the differential gear assembly to and through the left and right differential output members to the left and right brakes to mechanically actuate those brakes.

When the brakes are normally actuated for service braking by hydraulic pressure, the mechanical brake apply system is concurrently actuated by the actuator but in a follow-up mode to the hydraulic pressure brake actuations so that it has no substantial effect on the hydraulic pressure application of the brakes during hydraulic pressure actuation. The mechanical brake apply system will act to apply the brakes when the brake actuator is moved in the brake apply direction and the hydraulic brake apply system has reached a brake apply limit. This hydraulic brake apply limit may range from zero brake application to a maximum available hydraulic pressure brake application, depending upon the amount of hydraulic pressure which is available for hydraulic pressure actuation of the brakes. If the brake actuator is further moved in the brake actuation direction after the hydraulic brake apply limit has been reached, because of additional braking force demand being made, the mechanical brake apply system will act as an emergency brake system. The mechanical brake apply system preferably also has means holding it in the applied mode so that it will also act as a parking brake system. Each of the left and right brakes has a brake return-limiting one-way clutch arrangement therein which allows the brake applying movement of one of the differential output members to be different from the brake applying movement of the other of the differential output members during a mechanically applied braking action so as to take up different amounts of braking wear that may exist in each of the left and right brakes to then achieve equal braking forces generated in the left and right brakes and exerted on the left and right driving and braking members to be braked. Each of the one-way clutches limits the return stroke of the brake associated therewith when that brake returns from an applied condition to the full release condition, establishing an adjusted brake position of that associated brake which is adjusted for the amount of brake wear of that associated brake since the last adjustment thereof.

IN THE DRAWINGS

Figure 1:
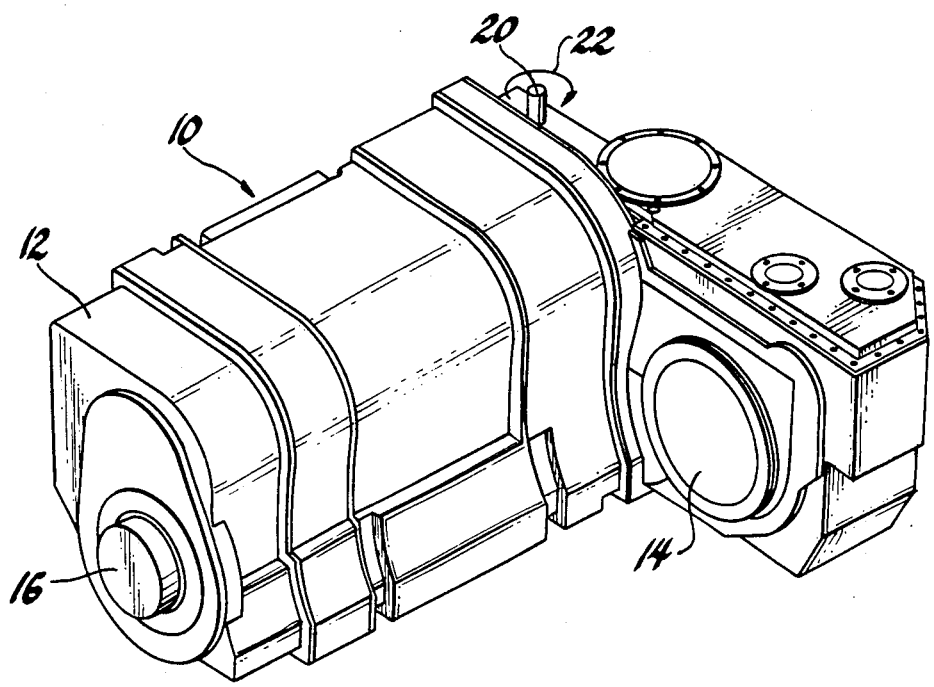
FIG. 1 is a simplified perspective view of a typical military cross-drive transmission showing the location of the engine input, the left one of the left and right outputs and the brake input shaft.
Figure 2:
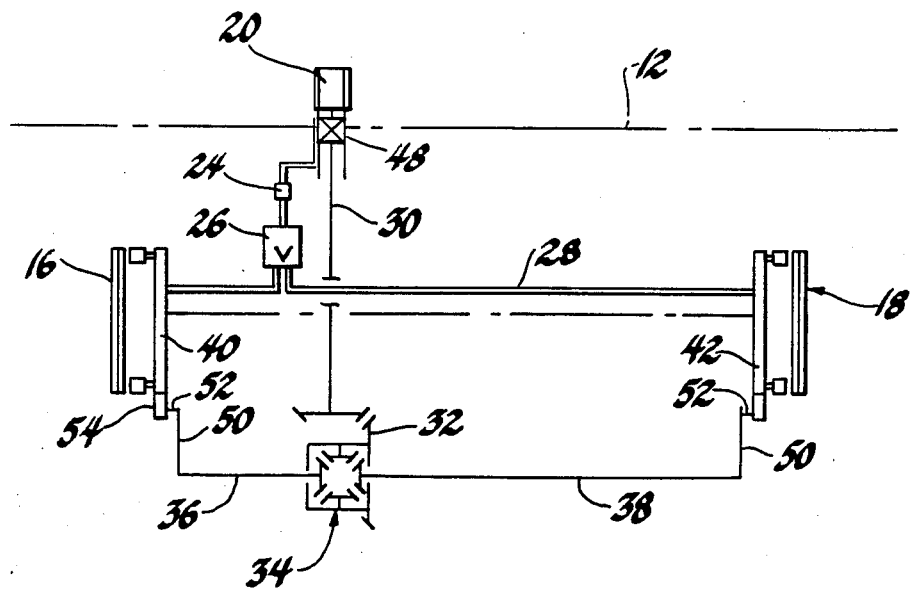
FIG. 2 is a schematic illustration of the brake apply system embodying the invention and including the hydraulic brake apply system and the mechanical brake apply system.

The cross-drive transmission 10 is typical of such transmissions used to drive track laying vehicles. For example, they may drive tanks or armored vehicles or the like. They may also be used in civilian applications in track laying vehicles, and in some instances may be used with other drive arrangements such as road engaging wheels. The transmission 10 is somewhat schematically illustrated as including a transmission housing 12, an engine input 14, the right output member and brake pack 16, and a similar left output member and brake pack on the other end of the housing but not shown in this view. The brake demand input shaft 20 is connected to the vehicle driver's station by mechanical linkage and/or electrical control means. The shaft responds to driver brake pedal movement to rotate in the direction of arrow 22 to control the hydraulic and mechanical brake systems inside the transmission which are sensitive to rotation of shaft 20. As more particularly shown in the schematic illustration of FIG. 2, shaft 20 will rotatably drive a cam 24 which is attached to shaft 20. Cam 24 actuates an electro-hydraulic brake control valve 26 which regulates the brake apply pressure being delivered to the left brake pack 16 and the right brake pack 18. A suitable source of hydraulic pressure provides the supply pressure which is controlled by valve 26 to produce regulated brake apply pressure. The pressure value of the regulated brake apply pressure may be determined by compression of a regulator spring and appropriate valve areas within valve 26. It is preferred that the relationship of the amount of brake apply pressure delivered through brake line 28 to the hydraulic service brakes which actuates the brake packs 16 and 18 be fixed in relation to the angular amount of rotation of shaft 20, and be independent of the stroke requirements of the co-linear input to the mechanical system. Therefore, a normal maximum hydraulic pressure applied through brake line 28 will correspond to a particular maximum hydraulic pressure shaft 20 rotation angle in the direction of arrow 22. At this rotation angle, cam 24 enters a dwell phase permitting additional stroke of the mechanical system, if required because the primary hydraulically actuated brake system does not supply the necessary braking force.

The mechanical system is actuated by rotation of shaft 20 acting through shaft 30. Shaft 30 drives the input member 32 of a differential gear assembly 34. The differential gear assembly 34 has an output member 36 connected to mechanically actuate the brake pack 16 and another output member 38 connected to mechanically actuate the brake pack 18. This actuation may be the typical cam apply mechanism for emergency and parking brake actuation such as that commonly used on heavy vehicles, including military vehicles with cross drive transmissions. As shown in somewhat greater detail in FIG. 3, the mechanical actuation of the brake packs may occur by arcuate movement of a ball ramp cam ring 40 for brake pack 16 and a similar ball ramp cam ring 42 for brake pack 18. Multiple plate disc brake packs 16 and 18 are outboard of and coaxial with the brake apply cam rings 40 and 42, respectively, but are not shown in FIG. 3. Return limiting one-way clutch means 44 and 46 are respectively provided for the ball ramp cam rings 40 and 42 of brake packs 16 and 18. FIG. 4 shows the construction of the clutch mechanism 44. The clutch mechanism 46 is similarly constructed. Another one-way clutch device 48 is provided between shaft 20 and shaft 30 and allows rotational advancement of shaft 30 with respect to the actuation shaft 20 when the stroke adjusting clutch mechanisms 44 and 46, or either of them, limit the return stroke of the ball ramp cam apply rings 40 and 42 for the left and right brake packs.

FIG. 4 shows the brake torque arm 50 which is used to move the cam apply ring 40 to actuate the brake disc pack 16. Another similar brake torque arm 50 is provided to actuate ball ramp cam ring 42 to actuate the other brake disc pack 18.

Figure 3:
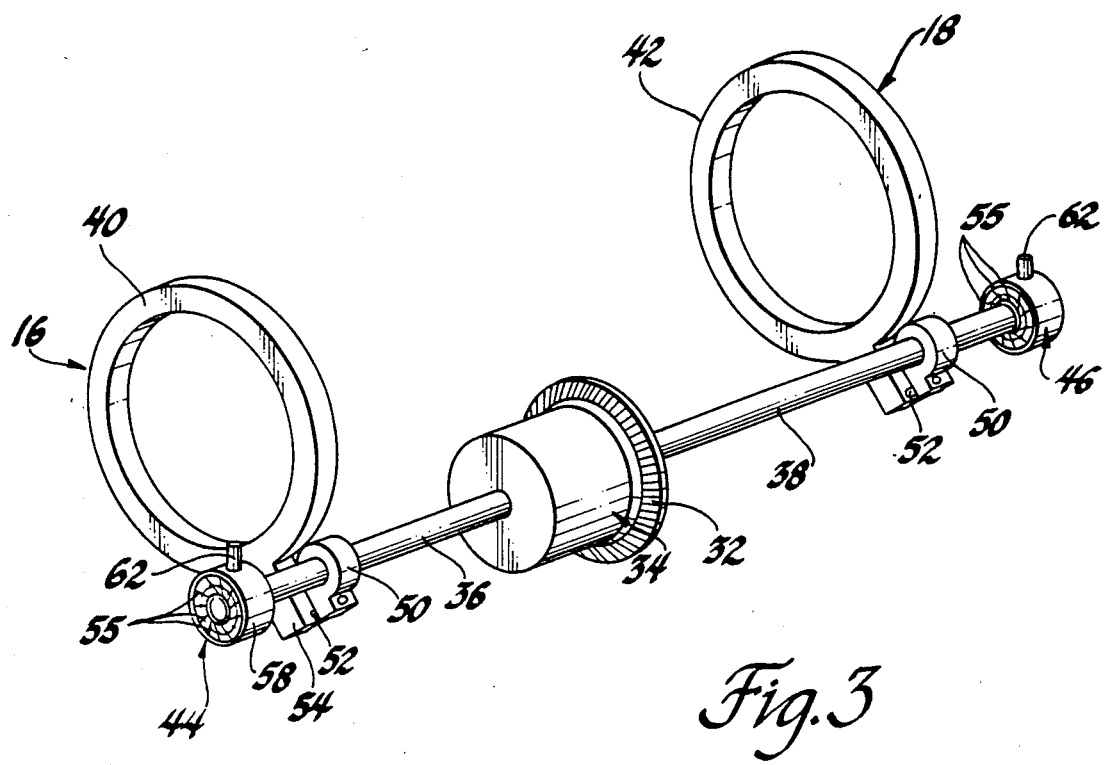
FIG. 3 is a schematic perspective view of the mechanical portions of the brake apply system of FIG. 2.
Figure 4:
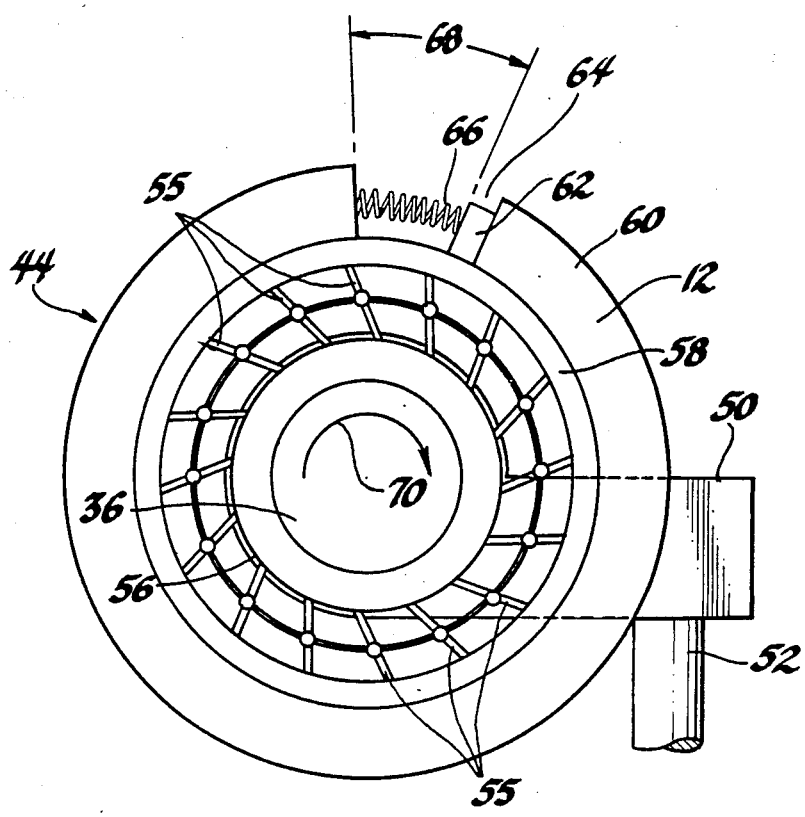
FIG. 4 is a fragmentary cross-section view of the one-way clutch adjustment mechanism in the mechanical brake apply system.

FIG. 3 shows the rotation of the brake torque arm 50 during mechanical brake apply, that rotation resulting from rotation of the differential output member 38 to which the brake torque arm 50 is secured. The brake torque arm 50 is illustrated as having a mechanical connection 52 which suitably engages a lug 54 on the ball ramp cam ring 40 to move that ring arcuately as the brake is mechanically applied in accordance with arcuate movement of the brake torque arm 50. The one-way clutch mechanism 44 is illustrated as including a sprag clutch arrangement in which sprags 55 are located between the sprag inner race 56, which is effectively a part of the differential gear assembly output member 36, and the sprag outer race 58. Sprag outer race 58 is mounted for arcuate rotational movement in a portion 60 of the transmission housing 12. A lug 62 extending outwardly from the sprag outer race 58 is positioned in an angularly formed slot 64 formed in housing portion 60 and is urged in the apply direction by the force of a spring 66 so that it is urged toward engagement with one side of slot 64. The angle 68 formed by slot 64 corresponds to the desired brake pack running clearance with the particular ball ramp angle selected as part of the ball ramp cam apply system which the ring 40 controls. Because of the manner of installation of the sprags 55 and their relationship to their inner and outer races 56 and 58, the brake torque arm 50 and the differential output member 36 can rotate in the direction of arrow 70 as far as is necessary due to the free clutch action of the sprag clutch mechanism. However, upon the release stroke of the brake torque arm 50 in which it moves in the direction opposite that indicated by arrow 70, sprag 55 will lock the sprag inner race 56 to the outer race 58 and cause that race to be moved arcuately counterclockwise as seen in FIG. 4, moving lug 62 against the force of spring 66 until lug 62 has been angularly displaced to the desired angle which corresponds to the running clearance of the brake disc pack 16. This limits the return stroke of the brake torque arm so that the ball ramp cam apply ring 40 is positioned in an adjusted position and the brake pack 16 is therefore adjusted for wear.

Differential gear assembly 34 drives its output members 36 and 38 rotationally in the brake apply direction when the mechanical brake system is in the process of being actuated. The action of the differential gear assembly 34, together with the free rotational action permitted by the clutch mechanisms 44 and 46 during brake actuating movement of the differential output members, allows the advancement of one differential output member, for example output member 36, relative to the other differential output member 38, to achieve equal braking forces exerted on the brake discs in the brake packs 16 and 18.

The brake apply system embodying the invention therefore has a hydraulic brake apply arrangement and a mechanical brake apply arrangement actuated through the same rotary input shaft by the vehicle operator. Rotation of that shaft rotatably drives a cam having a first range which actuates an electro-hydraulic brake valve to increase the hydraulic brake apply pressure during the hydraulic service brake operation of the brake disc packs 16 and 18. When a predetermined actuation or input shaft rotation angle of shaft 20 has occurred, the cam 24 enters a second range which is a dwell phase permitting additional stroke of the mechanical system if required to achieve brake demand. Actuation of the mechanical system will cause the brakes to be adjusted to compensate for any brake wear. The mechanical system is driven by further rotation of shaft 30, the one way clutch arrangement 48 permitting this to occur without further affecting the hydraulic system. Shaft 30 drives the input side of the differential 34 to drive the differential gear assembly output members 36 and 38 to rotate the brake torque arms 50 and connection 52 and therefore drive the ball ramp cam apply rings 40 and 42 to actuate the brake packs. The action of the differential gear assembly 34 and the one-way clutch mechanisms 44 and 46 permit any brake wear to be taken up by additional movement of the appropriate differential output member 36 or 38 relative to the other. Upon brake application, equalized brake actuating forces are then delivered to the brake packs 16 and 18. The one-way clutch mechanisms 44 and 46 each limit the return stroke of their respectively associated ball ramp cam apply rings 40 and 42 to establish brake adjustment.

The embodiments of the invention in which an exclusive property or privilege is claimed are defined as follows:

1. In a mechanism having first and second members to be braked and first and second brakes respectively acting on said first and second members to be braked when actuated to brake the same, hydraulic brake actuation means and mechanical brake actuation means for actuation of said first and second brakes, each of said brakes being subject to wear and each of said brakes having adjusting means therein active upon brake release after a mechanical brake apply to adjust the brake associated therewith for such wear, the improvement comprising:

a rotatable brake actuation input shaft having cam means rotatably driven by said input shaft through an arc of rotation in accordance with brake force demand, said cam means having first and second consecutive predetermined ranges of cam means arcuate movement;

mechanical drive means operatively driven by rotational movement of said input shaft throughout a driven range sufficient to actuate said brakes through said mechanical brake actuation means from brake release to a maximum mechanically applied brake apply condition, said mechanical drive means including a differential gear assembly having an input member operatively driven by said input shaft and first and second output members operatively differentially driving said mechanical brake actuation means respectively for said first and second brakes;

hydraulic brake actuation pressure control means responsive to said first predetermined range of cam means arcuate movement to permit the delivery of hydraulic brake actuating pressure to said hydraulic brake actuation means through a predetermined brake actuating pressure range which will actuate said brakes from release to a maximum hydraulic brake actuating pressure brake applied condition, said second predetermined range of cam means arcuate movement being a dwell range permitting additional stroke of said mechanical drive means as required to cause said mechanical brake actuation means to take up any unadjusted brake wear in said brakes and obtain the maximum mechanically applied brake apply condition without affecting said hydraulic brake actuation pressure control means;

said brake adjusting means comprising brake return-limiting one-way clutch means in each of said first and second brakes, said clutch means respectively allowing brake applying movement of one of said differential gear assembly output members relative to brake applying movement of the other of said differential gear assembly output members and permitting different brake actuating movements of said output members to take up different amounts of brake wear that may exist in each of said first and second brakes to then achieve equal braking forces generated in said first and second brakes and exerted on said first and second members to be braked, said clutch means each limiting the return stroke of said brake associated therewith when said associated brake returns to the full release condition to establish an adjusted brake position adjusted for the amount of brake wear of said associated brake since the last adjustment thereof.

2. For use in a vehicle having a left drive member and a right drive member for respectively driving a left and a right vehicle wheel or the like, and left and right brakes when actuated respectively acting on said left and right drive members to brake the same, hydraulic brake actuation means and mechanical brake actuation means for actuation of said left and right brakes, each of said brakes being subject to wear and each of said brakes having adjusting means wherein active upon brake release after a mechanical brake apply to adjust the brake associated therewith for such wear, the improvement comprising:

a rotatable brake actuation input shaft having cam means rotatably driven by said input shaft through an arc of rotation in accordance with brake force demand, said cam means having first and second consecutive predetermined ranges of cam means arcuate movement;

mechanical drive means operatively driven by rotational movement of said input shaft throughout a driven range sufficient to actuate said brakes through said mechanical brake actuation means from brake release to a maximum mechanically applied brake apply condition, said mechanical drive means including a differential gear assembly having an input member operatively driven by said input shaft and left and right output members operatively differentially driving said mechanical brake actuation means respectively for said left and right brakes;

hydraulic brake actuation pressure control means cooperating with and responsive to said first predetermined range of cam means arcuate movement to permit the delivery of hydraulic brake actuating pressure to said hydraulic brake actuation means through a predetermined brake actuating pressure range which when applied to said brakes will actuate said brakes in a brake condition range from release to a maximum hydraulic brake actuating pressure brake applied condition, said second predetermined range of cam means arcuate movement being a dwell range permitting additional stroke of said mechanical drive means as required to cause said mechanical brake actuation means to take up any unadjusted brake wear in said brakes and obtain up to the maximum mechanically applied brake apply condition without affecting said hydraulic brake actuation pressure control means;

said brake adjusting means comprising brake return-limiting one-way clutch means in each of said left and right brakes, said clutch means respectively allowing brake applying movement of one of said differential gear assembly output members relative to brake applying movement of the other of said differential gear assembly output members and permitting different brake actuating movements of said output members during a mechanically applied braking action to take up different amounts of brake wear that may exist in each of said left and right brakes to then achieve equal braking forces generated in said left and right brakes and exerted on said left and right drive members to be braked, said clutch means each limiting the return stroke of said brake associated therewith when said associated brake returns to the full release condition to establish an adjusted brake position adjusted for the amount of brake wear of said associated brake since the last adjustment thereof.

3. In a cross drive transmission having a left and a right driving and braking member and left and right mechanically and hydraulic pressure actuatable brakes thereon for respectively braking said left and right driving and braking members, a brake actuator moveable in accordance with braking force demand for controlling the mechanical actuation and the hydraulic actuation of said brakes, said actuator acting when braking force is demanded for normal service braking to admit hydraulic pressure to said brakes in accordance with the braking force demanded up to a hydraulic pressure limit;

a mechanical brake apply system including a differential gear assembly having an input member and left and right differential output members, said left and right differential output members being respectively connected to said brakes to mechanically actuate said brakes with equalized brake apply force;

said actuator also acting on said differential gear assembly input member in accordance with brake force demand with mechanical brake actuation forces being transmitted through said differential gear assembly to and through said left and right differential output members to said brakes to mechanically actuate said brakes;

said brakes being normally actuated for service braking by hydraulic pressure so that concurrent actuation of said mechanical brake apply system by said actuator acts in a follow-up mode and has no substantial effect on the hydraulic pressure application of said brakes;

said mechanical brake apply system acting to apply said brakes when said brake actuator is moved in the brake apply direction and said hydraulic brake apply system reaches a brake apply limit which limit may range from zero brake application to a maximum available hydraulic pressure brake application depending on the amount of available hydraulic pressure available for hydraulic actuation of the brakes, and said brake actuator is further moved in response to additional braking force demand, said mechanical brake apply system therefore acting as an emergency brake system and having means holding it in the applied mode to act as a parking brake system;

each of said left and right brakes having brake return-limiting one-way clutch means therein, said one-way clutch means respectively allowing brake applying movement of one of said differential output members relative to brake applying movement of the other of said differential output members and permitting different brake actuating movements of said differential output members during a mechanically applied braking action to take up different amounts of brake wear that may exist in each of said left and right brakes to then achieve equal braking forces generated in said left and right brakes and exerted on said left and right driving and braking members to be braked, said one-way clutch means each limiting the return stroke of said brake associated therewith when said associated brake returns from an applied condition to the full release condition to establish an adjusted associated brake position which is adjusted for the amount of brake wear of said associated brake since the last adjustment thereof.

* * * * *